United States Patent [19]

Masuda et al.

[11] 4,329,709

[45] May 11, 1982

[54] SOLID-STATE COLOR IMAGING DEVICE

[75] Inventors: Michio Masuda, Yokohama; Hiroaki Nabeyama, Kamakura; Toshiyuki Kurita, Yokohama, all of Japan

[73] Assignee: Hitachi, Ltd., Tokyo, Japan

[21] Appl. No.: 192,998

[22] Filed: Oct. 2, 1980

[30] Foreign Application Priority Data

Oct. 3, 1979 [JP] Japan .................................. 54-126870

[51] Int. Cl.$^3$ .......................... H04N 9/04; H04N 9/07
[52] U.S. Cl. ..................................................... 358/44
[58] Field of Search ............................ 358/41, 44, 213

[56] References Cited

U.S. PATENT DOCUMENTS

| | | | |
|---|---|---|---|
| 4,010,319 | 3/1977 | Levine | 358/213 |
| 4,032,976 | 6/1977 | Levine | 358/213 |
| 4,040,092 | 8/1977 | Carnes | 358/213 |
| 4,246,601 | 1/1981 | Sato et al. | 358/47 |

Primary Examiner—Robert L. Richardson
Attorney, Agent, or Firm—Craig and Antonelli

[57] ABSTRACT

A solid-state color imaging device includes a plurality of different color filters arranged above photo-electric conversion elements arranged in matrix, such that each of chroma signals necessary for color reproduction includes the same spectrum of vertical smear component. A single memory is provided to store a vertical smear component included in one of the chroma signals necessary for the color reproduction. By subtracting a predetermined multiple of the output of the memory from the output signals on all of the chroma signal output lines, the vertical smear components appearing in all of the chroma signal output lines are eliminated.

12 Claims, 6 Drawing Figures (a)　　　　　　　　　(b)

SOLID-STATE COLOR IMAGING DEVICE

The present invention relates to a solid-state imaging device, and more particularly to a solid-state color imaging device.

As shown in FIG. 1, a known solid-state MOS imager 1 which is known by, for example, J. D. Plummer et al "Optical Circuits and Sensors", 1972 IEEE International Solid-State Circuits Conference, pages 30–31 comprises a photodiode array 2 having the same number of photodiodes equal in number to the number of required picture elements and arranged in a matrix in horizontal and vertical directions to serve as photoelectric conversion elements, a MOS transistor switch array 3 connected thereto to select a row of the photodiode array, a MOS transistor switch array 3' to select a column of the photodiode array, a horizontal scanning circuit 4 including a shift register and a vertical scanning circuit 5 including a shift register. By applying appropriate clock pulse signals to the horizontal and vertical scanning circuits 4 and 5, horizontal and vertical scan pulses which are shifted versions of input pulses $V_{sx}$ and $V_{sy}$, respectively, are sequentially produced at respective stages of the horizontal and vertical scanning circuits. In response to those pulses, the switches 3' and 3 are sequentially activated so that respective signals from the photodiode array 2 are take on a video output line 40. Numeral 41 denotes a video power supply, numeral 42 a load resistor and numeral 43 an output terminal. Since the operation of the circuit shown in FIG. 1 is well known, no further explanation is given here. In this type of imager, it is desirable that only the photodiode array 2 is light-sensitive. Actually, however, the peripheral circuits are also light-sensitive. Referring to FIG. 2 which shows an enlarged view of a portion constituting one picture element, each picture element comprises a photodiode 2 and a MOS transistor switch 3 having a source region which is contiguous with a part of the photodiode 2. Numeral 6 denotes a horizontal signal line connected to a gate electrode 6' of the MOS transistor switch 3, and numeral 8 denotes a vertical signal line connected to a drain electrode 7 of the MOS transistor switch 3. The horizontal signal line 6 and the vertical signal line 8 are multilayer-wired and insulated from each other.

Though it is desirable that only the photodiode 2 is light-sensitive, the drain electrode 7 of the MOS transistor switch 3 is also light-sensitive and the peripheral area is also light-sensitive because carriers generated around the drain 7 are collected to the drain 7. Since all of the drain electrodes of the MOS transistor array usually consisting of several hundreds of MOS transistors are connected to the vertical signal line 8, light information radiated onto the respective MOS transistors or the periphery thereof are combined on the vertical signal line 8 and stored therein. Thus, each vertical signal line stores a charge which is proportional to an integration of vertical components of the irradiated picture pattern. When a picture pattern as shown in (a) of FIG. 3 is to be imaged, a vertical light smear appears on a monitor screen as shown in (b) of FIG. 3. The vertical smear causes shades above and below light areas, which materially deteriorates the quality of reproduced image. If noting that the vertical smear signal component distributes evenly in vertical direction, it may be considered that the vertical smear can be eliminated by storing a one-horizontal period output signal of the imager in a vertical blanking interval in a memory and subtracting it from respective horizontal line signal components in the next field. However, when a one-chip solid-state color imager is used to produce a color video signal, the vertical smear should be eliminated for the respective color signals and memory devices should be required for the respective color signals. Furthermore, a subtraction circuit itself comes to be complex.

FIG. 4 shows an example of construction which may be considered for the one-chip solid-state color imager using filters of additive primaries. Numeral 2 denotes a photodiode array similar to that shown in FIG. 1. Numerals 10, 11 and 12 denote optical filters of red, green and blue, respectively. The shown arrangement of color filters is shown in FIG. 6 of U.S. Pat. No. 3,971,065. Numerals 13, 14 and 15 denote signal lines of red, green and blue, respectively each of which is interconnected as shown in FIGS. 21 and 22 of U.S. Pat. No. 4,054,915. In the structure shown in FIG. 4, since the optical filters overlay the signal lines of respective colors, the signal lines also have photo-electric conversion function, which causes the vertical smear. When two lines are read in every horizontal period, red, green and blue output signal components $\bar{R}$, $\bar{G}$ and $\bar{B}$ are expressed by:

$$\bar{R} = R + (\Delta R + \Delta G)$$

$$\bar{G} = (G + \Delta R + \Delta G) + (G + \Delta B + \Delta G)$$

$$= 2G + (\Delta R + 2\Delta G + \Delta B)$$

$$\bar{B} = B + (\Delta B + \Delta G)$$

where, R, G and B are pure information signals and $\Delta R$, $\Delta G$ and $\Delta B$ are vertical smear components due to the photo-electric conversion of the signal lines of the respective colors. Since the spectra of the vertical smear components of the respective color signals are different from each other, the vertical smear should be eliminated by separate memories.

It is an object of the present invention to provide a solid-state color imaging device which can eliminate the vertical smear with simpler hardware.

In order to attain the above object, in accordance with the present invention, the consideration is taken to the arrangement of the color filters such that a spectrum of each vertical smear component involved is identical to each other. With this arrangement, it is necessary to store only the vertical smear component of one of the three signals necessary for color reproduction and the stored signal may be used to eliminate the vertical smears for all of the three signals necessary for color reproduction.

The present invention will now be explained referring to the accompanying drawings, in which.

Figure 5:
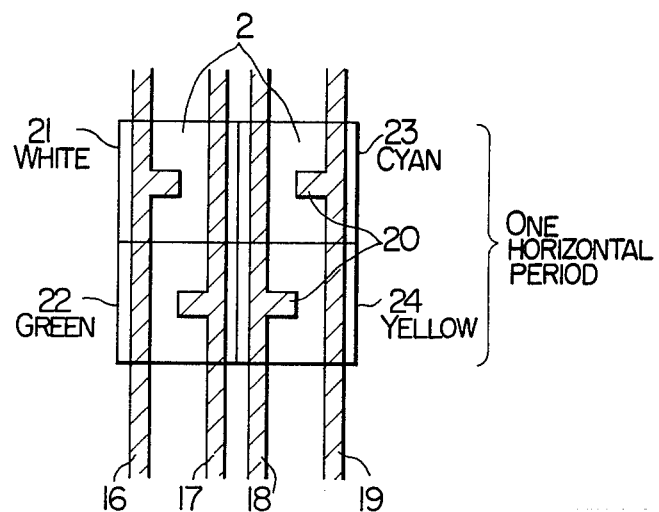
FIG. 5 shows an arrangement of color filters in accordance with one embodiment of the present invention.

FIG. 5 shows an enlarged view of photodiodes of a one-chip solid-state color imager which embodies the color filter arrangement in accordance with one embodiment of the present invention. Numeral 21 denotes a white optical filter, 22 a green optical filter, 23 a cyan (complement of red) optical filter, 24 a yellow (complement of blue) optical filter, 16 a white signal line, 17 a green signal line, 18 a cyan signal line and 19 a yellow signal line. The white signal line 16 and the green signal line 17 are multilayer-wired above the photodiode disposed beneath the white optical filter 21, and above the photodiode disposed beneath the green optical filter 22. Similarly, the cyan signal line 18 and the yellow signal line 19 are multilayer-wired above the photodiodes. The signal lines 16, 17, 18 and 19 and the photodiodes are insulated from each other and electrically connected at a junction 20.

The color reproduction by the one-chip solid-state color imager which embodies the color filter arrangement shown in FIG. 5 is now explained. The spectra of the respective filters with respect to the primaries are given by W=R+G+B, G=G, Ye=R+G, and Cy=G=B, where W is white, G is green, Ye is yellow and Cy is cyan. In order to produce a luminance signal Y, red signal R and blue signal B for the color reproduction, the following signals are to be produced.

Luminance signal Y=W+G+Ye+Cy=2(R+2G+B)

Red signal R=(W−G)+(Ye−Cy)=2R

Blue signal B=(W−G)−(Ye−Cy)=2B

The luminance signal inherently is 0.3R+0.59G+0.11B but it is substituted by R+2G+B taking the spectrometric characteristic (that is, wavelength dependency of sensitivity) of the solid-state imager into consideration. The signals Y, R and B are produced through the operations described above.

In the embodiment shown in FIG. 5, a combination of the white filter 21 and the green filter 22, and a combination of the cyan filter 23 and the yellow filter 24 are used. The combination of the white filter 21 and the green filter 22 or the combination of the cyan filter 23 and the yellow filter 24 essentially provides the luminance signal of 0.3R+0.59G+0.11B. The white filter provides 0.3R+0.3G+0.3B while the green filter provides 0.3G. The cyan filter provides 0.3R+0.3G while the yellow filter provides 0.3G+0.3B. It should be understood by those skilled in the art that any color combination of the filters 21 and 22 or the filters 23 and 24 shown in FIG. 5 may be used so long as the combination provides 0.3R+0.59G+0.11B. Appropriate combinations of additive primaries (red, blue and green) and subtractive primaries (cyan, mazenta and yellow which are complements of red, green and blue, respectively) are preferable but other half-tone colors may be used.

Suppose that a vertical smear component derived from the white signal photodiode is represented by $\Delta W$ and a vertical smear component derived from the green signal photodiode is represented by $\Delta G$. Referring to FIG. 5, both the white signal line 16 and the green signal line 17 are on both the white photodiode and the green photodiode. As a result, a crosstalk occurs between the respective color signals and the white signal line 16 picks up not only the vertical smear component $\Delta W$ but also the vertical smear component $\Delta G$ from the green signal line 17 so that it produces $\Delta W + \Delta G$ as the vertical smear component. Similarly, the green signal line picks up the vertical smear component of $\Delta G + \Delta W$. Similarly, the cyan signal line 18 and the yellow signal line 19 pick up the vertical smear components of $\Delta Cy + \Delta Ye$ and $\Delta Ye + \Delta Cy$, respectively, where $\Delta Cy$ is a vertical smear component derived from the cyan photodiode and $\Delta Ye$ is a vertical smear component derived from the yellow photodiode.

Figure 6:
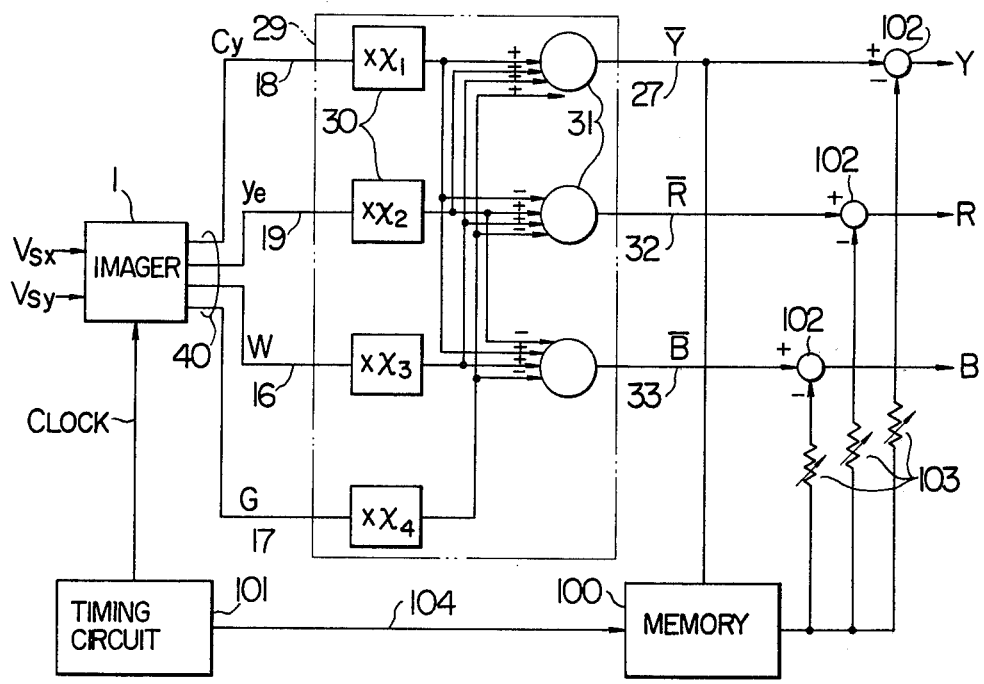
FIG. 6 shows a circuit diagram for embodying the present invention.

FIG. 6 shows a circuit diagram which embodies the present invention and which is suited for the application of the filter arrangement shown in FIG. 5. In FIG. 6, numeral 29 denotes a matrix circuit for producing a luminance signal 27 ($\overline{Y}$), a red signal 32 ($\overline{R}$) and a blue signal 33 ($\overline{B}$) which are necessary for color reproduction and include vertical smear components, from signal lines 16, 17, 18 and 19. The Cy, Ye, W and G are inherently of the same magnitude but the ratios of the magnitudes may be changed to improve the color reproduction. This is referred to as a linear matrix. The matrix 29 comprises multipliers 30 and adders 31 and produces signals as defined by the following formulae:

$$\overline{Y} = x_1 \overline{Cy} + x_2 \overline{Ye} + x_3 \overline{W} + x_4 \overline{G} \tag{1}$$

$$\overline{R} = (x_3 \overline{W} + x_2 \overline{Ye}) - (x_1 \overline{Cy} + x_4 \overline{G}) \tag{2}$$

$$\overline{B} = (x_1 \overline{Cy} + x_3 \overline{W}) - (x_2 \overline{Ye} + x_4 \overline{G}) \tag{3}$$

where $x_1$, $x_2$, $x_3$ and $x_4$ are constants. The vertical components $\Delta Y$, $\Delta G$ and $\Delta B$ of Y, G and B, respectively, are expressed by;

$$\Delta Y = x_1(\Delta Cy + \Delta Ye) + x_3(\Delta W + \Delta G) - \tag{4}$$
$$x_2(\Delta Ye + \Delta Cy) - x_4(\Delta G + \Delta W)$$
$$= (x_1 - x_2)(\Delta Ye + \Delta Cy) + (x_3 - x_4)(\Delta G + \Delta W)$$

$$\Delta R = x_2(\Delta Ye + \Delta Cy) + x_3(\Delta W + \Delta G) - \tag{5}$$
$$x_1(\Delta Cy + \Delta Ye) - x_4(\Delta G + \Delta W)$$
$$= (x_2 - x_1)(\Delta Ye + \Delta Cy) + (x_3 - x_4)(\Delta W + \Delta G)$$

$$\Delta B = x_1(Cy + \Delta Ye) + x_3(\Delta W + \Delta G) - \tag{6}$$
$$x_2(\Delta Ye + \Delta Cy) - x_4(\Delta G + \Delta W)$$
$$= (x_1 - x_2)(\Delta Ye + Cy) + (x_3 - x_4)(\Delta G + \Delta W)$$

Accordingly;

$$\Delta Y = (x_1 + x_2)(\Delta R + \Delta G) + (x_1 + x_2)(\Delta B + \Delta G) \tag{7}$$
$$+ x_3 + x_4)(\Delta R + \Delta G + \Delta B) + (x_3 + x_4)\Delta G$$
$$= (x_1 + x_2 + x_3 + x_4)(\Delta R + 2\Delta G + \Delta B)$$

$$\Delta R = (x_2 + x_1)(\Delta R + \Delta G) + (x_2 - x_1)(\Delta B + \Delta G) + \tag{8}$$
$$(x_3 - x_4)(\Delta R + \Delta B + \Delta G) + (x_3 - x_4)\Delta G$$
$$= (-x_1 + x_2 + x_3 - x_4)(\Delta R + 2\Delta G + \Delta B)$$

$$\Delta B = (x_1 - x_2)(\Delta R + \Delta G) + (x_1 - x_2)(\Delta B + \Delta G) + \tag{9}$$
$$(x_3 - x_4)(\Delta G + \Delta R) + (x_3 - x_4)(\Delta B + \Delta G)$$
$$= (x_1 - x_2 + x_3 - x_4)(\Delta R + 2\Delta G + \Delta B)$$

From the formulae (7), (8), (9);

$$\frac{\Delta R}{\Delta Y} = \frac{-x_1 + x_2 + x_3 - x_4}{x_1 + x_2 + x_3 + x_4} = \text{constant} \tag{10}$$

$$\frac{\Delta B}{\Delta Y} = \frac{x_1 - x_2 + x_3 - x_4}{x_1 + x_2 + x_3 + x_4} = \text{constant} \quad (11)$$

It is seen from the formulae (10) and (11) that ΔR and ΔB can be produced by multiplying ΔY with constants. In other words, by storing ΔY, the vertical smear components for all of $\overline{Y}$, $\overline{R}$ and $\overline{B}$ can be eliminated.

The circuit for eliminating the vertical smear components shown in FIG. 6 comprises a memory 100 for storing one horizontal period of veritcal smear component, a timing signal generator 101 for generating timing signals for writing and reading the memory 100, subtraction circuits 102 and variable gain circuits 103.

Figure 1:
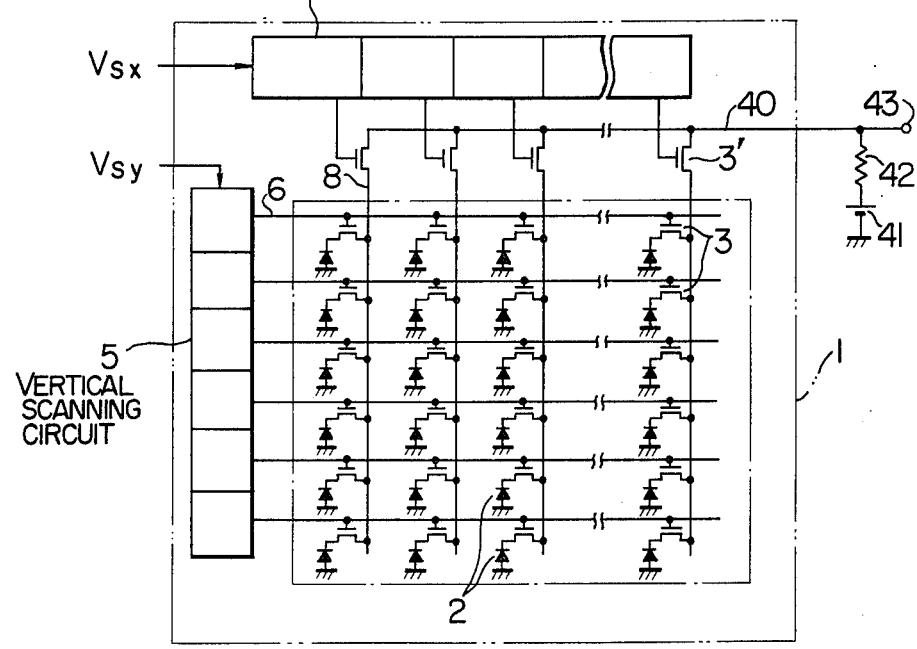
FIG. 1 shows a construction of a typical prior art solid-state imager to which the present invention is applicable.
Figure 2:
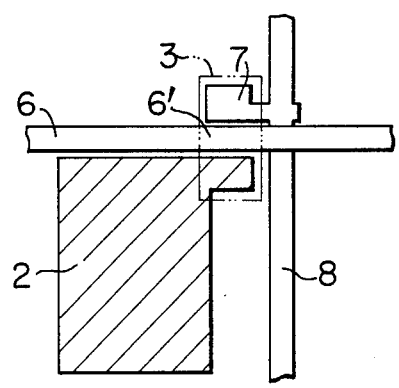
FIG. 2 shows an enlarged view of a photodiode and a MOS transistor switch of the imager shown in FIG. 1.
Figure 3:
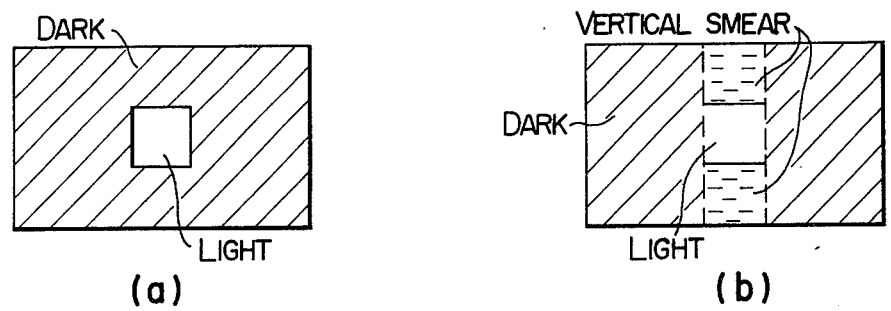
FIG. 3 illustrates a vertical smear which appears in the prior art solid-state imager.
Figure 4:
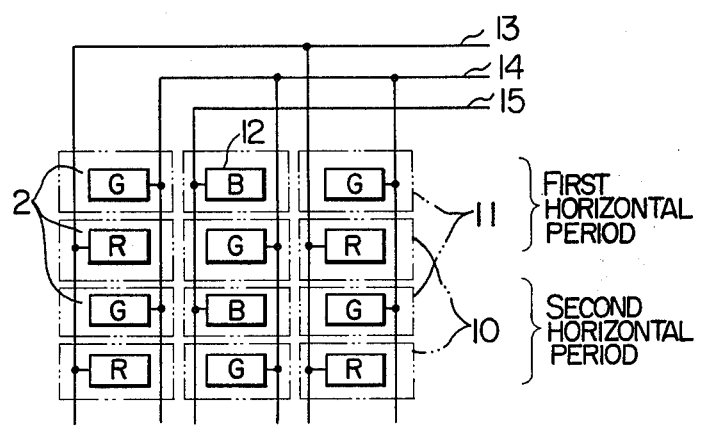
FIG. 4 shows an example of construction which may be considered for a solid-state color imager using filters of additive primaries.

The signals W, Cy, Ye and G picked up by the solid-state imager 1 are applied to the linear matrix circuit 29 to produce the luminance signal $\overline{Y}$ and chroma signals $\overline{R}$ and $\overline{B}$. The luminance signal $\overline{Y}$ and the chroma signals $\overline{R}$ and $\overline{B}$ include vertical smear components, the amounts of which are in proportional relation and the components are identical. Thus, by extracting a signal component of the luminance signal $\overline{Y}$ in a vertical blanking interval, only the vertical smear component generated in the vertical signal line 8 shown in FIG. 2 is picked up. The storing of the signal produced in one horizontal period in the vertical blanking interval in the memory 100 means the storing of the vertical smears which are integrated in vertical directions or vertical signal lines for one field. This stored vertical smear component is adjusted to a magnitude of vertical scan component matched to the signal by the variable gain circuit 103, and the adjusted vertical smear component is subtracted from the original luminance signal $\overline{Y}$ and the chroma signals $\overline{R}$ and $\overline{B}$ by the subtraction circuits 102 to produce correct signals $\overline{Y}$, $\overline{R}$ and $\overline{B}$ which are free from the vertical smear component. The content of the memory stored in the preceding field is cleared at the beginning of the vertical blanking inverval in the next field under the control of the timing generator circuit 101 so that it always stores a renewed signal magnitude matched to the vertical smear.

Let us consider a special case where the constants $x_1$, $x_2$, $x_3$ and $x_4$ of the linear matrix circuit 29 shown in FIG. 6 are all ones.

The formulae (1), (2) and (3) are then rewritten as $$\overline{Y} = \overline{Cy} + \overline{Ye} + \overline{W} + \overline{G} \quad (12)$$

$$\overline{R} = (\overline{W} + \overline{Ye}) - (\overline{Cy} + \overline{G}) \quad (13)$$

$$\overline{B} = (\overline{Cy} + \overline{W}) - (\overline{Ye} + \overline{G}) \quad (14)$$

Accordingly, the formulae (7), (8) and (9) are rewritten as $$\Delta Y = 4(\Delta R + 2\Delta G + \Delta B) \quad (15)$$

$$\Delta R = 0 \quad (16)$$

$$\Delta B = 0 \quad (17)$$

In this case, the vertical smear component appears only in Y and not in R and B. This means that only Y should be corrected and no correction is necessary for R and B.

In the embodiment explained above, the vertical smear component ΔY of the luminance signal Y is stored to correct the vertical smear components of the other signals. Alternatively, the vertical smear component of one of the Y, R and B signals may be stored to correct the vertical smear components of the other signals.

In the embodiment shown in FIG. 6, the luminance signal Y, the red signal R and the blue signal B are produced for the color reproduction by the matrix circuit 29. The signals necessary for the color reproduction may be the red signal, the green signal and the blue signal. Those can be selected by appropriately choosing the constants $x_1$, $x_2$, $x_3$ and $x_4$.

The above explanation has been made in conjunction with the case where the combination of the photodiode and the MOS transistor is used as the photo-electric conversion element. Alternatively, the photo-electric conversion element may be well-known charge coupled device (CCD) or charge transfer device (CTD). When the solid-state color imager including the CCD or CTD is used, the vertical smear components also appear in the chroma signal lines and the present invention is equally applicable to the case of using CCD or CTD as photo-electric conversion element.

As described hereinabove, according to the present invention, by arranging the filters such that the vertical smear components included in the chroma signals derived from the imager or the vertical smear components included in the reproduced signals necessary for the color reproduction are incorporated with the same spectrum for each signal, the elimination of the vertical smear is possible with the reduced number of memories.

Furthermore, according to the present invention, since only the storing of the vertical smear component included in the luminance signal, for example, is required, the memory capacity may be one thirds of that required when the vertical smear components of all of the chroma signals are to be stored, and hence the circuit becomes simple. Accordingly, a smaller number of expensive memories are needed and the cost can be reduced accordingly.

According to the present invention, the degradation of the quality of image due to the vertical smear components inherent to the solid-state imager is prevented and a high fidelity of image can be reproduced.

We claim:

1. A solid-state color imaging device comprising:
    a plurality of photo-electric conversion elements equal in number to the number of picture elements required, arranged in horizontal and vertical directions;
    horizontal and vertical scanning circuits for scanning said photo-electric conversion elements in the horizontal and vertical directions, respectively;
    four different color filters arranged above said photo-electric conversion elements, said filters including first and second color filters alternately arranged above the photo-electric conversion elements in one of adjacent vertical directions, and third and fourth color filters alternately arranged above the photo-electric conversion elements in the other vertical direction;
    first, second, third and fourth color signal lines connected to those of said photo-electric conversion elements which are related to said first, second, third and fourth color filters, respectively;
    signal processing circuit means for processing signals from said first, second, third and fourth signal lines to produce three signal outputs necessary for color reproduction on three output lines;

a memory connected to a selected one of said three output lines of said signal processing circuit means for reading and writing information under the control of a timing signal, said memory being operable to store one horizontal scan period of signal output in a vertical blanking interval in one field of scan derived from said selected output line and to read out said stored signal output in the next field of scan; and subtraction circuit means inserted intermediate said three output lines of said signal processing circuit means for receiving the output from said memory to subtract predetermined multiples of the output from said memory from the signal outputs on said three output lines, respectively.

2. A solid-state color imaging device according to claim 1, wherein said signal processing circuit means includes first, second, third and fourth multipliers for multiplying the signals from said first, second, third and fourth color signal lines, respectively, with predetermined constants and addition-subtraction circuits for performing addition and subtraction operations on the outputs from said multipliers to produce said three signal outputs necessary for the color reproduction.

3. A solid-state color imaging device according to claim 1, wherein some of said four different color filters are color filters selected from colors which are complement to the three additive primaries.

4. A solid-state color imaging device according to claim 3, wherein said first, second, third and fourth color filters are white, green, cyan and yellow filters, respectively, and said first, second, third and fourth color signal lines are white, green, cyan and yellow signal lines.

5. A solid-state color imaging device according to claim 3 or 4, wherein one of said three signal outputs from said signal processing circuit means is a luminance signal.

6. A solid-state color imaging device according to claim 5, wherein the other two of said three signal outputs from said signal processing circuit means are a red signal and a blue signal.

7. A solid-state color imaging device according to claim 3 or 4, wherein said three signal outputs from said signal processing circuit means are a green signal, a red signal and a blue signal.

8. A solid-state color imaging device comprising:
a plurality of photo-electric conversion elements equal in number to the number of picture elements required, arranged in horizontal and vertical directions;

horizontal and vertical scanning circuits for scanning said photo-electric conversion elements in the horizontal and vertical directions, respectively;

four different optical filters arranged above said photo-electric conversion elements, said optical filters including white and green filters alternately arranged above the photo-electric conversion elements in one of adjacent vertical directions, and cyan and yellow filters alternately arranged above the conversion elements in the other vertical direction;

white, green, cyan and yellow signal lines connected to those of said photo-electric conversion elements which are related to said white, green, cyan and yellow filters, respectively;

signal processing circuit means for processing the signals from said white, green, cyan and yellow signal lines to produce luminance, red and blue signal outputs necessary for color reproduction on three output lines;

a memory connected to a selected one of said three output lines of said signal processing circuit means for reading and writing information under the control of a timing signal, said memory being operable to store one horizontal scan period of signal output in a vertical blanking interval in one field of scan derived from said selected output line and to read out said stored signal output in the next field of scan, and subtraction circuit means inserted intermediate said three output lines of said signal processing circuit means for receiving to subtract predetermined multiples of the output from said memory from the signal outputs on said three output lines, respectively.

9. A solid-state color imaging device according to claim 8, wherein said signal processing circuit means includes first, second, third and fourth multipliers for multiplying the signals from said white, green, cyan and yellow signal lines, respectively, with predetermined constants, an adder for adding the outputs of said first, second, third and fourth multipliers to produce a luminance signal, a first adder-subtractor for adding the outputs of said first and fourth multipliers and subtracting the outputs of said second and third multipliers to produce a red signal, and a second adder-subtractor for adding the outputs of said first and third multipliers and subtracting the outputs of said second and fourth multipliers to produce a blue signal.

10. A solid-state color imaging device according to claim 1 or 8, wherein said photo-electric conversion element includes the combination of photodiode and MOS transistor.

11. A solid-state color imaging device according to claim 1 or 8, wherein said photo-electric conversion element is a charge coupled device.

12. A solid-state color imaging device according to claim 1 or 8, wherein said photo-electric conversion element is a charge transfer device.

* * * * *